United States Patent
Nakano et al.

(10) Patent No.: US 11,220,327 B2
(45) Date of Patent: Jan. 11, 2022

(54) AIRCRAFT

(71) Applicant: SUBARU CORPORATION, Tokyo (JP)

(72) Inventors: Kohei Nakano, Tokyo (JP); Takayuki Oguri, Tokyo (JP); Yukinobu Tomonaga, Tokyo (JP); Akitoshi Sakaguchi, Tokyo (JP); Maki Kikuchi, Tokyo (JP); Hiroki Kato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 371 days.

(21) Appl. No.: 16/373,061

(22) Filed: Apr. 2, 2019

(65) Prior Publication Data
US 2019/0344879 A1 Nov. 14, 2019

(30) Foreign Application Priority Data
May 10, 2018 (JP) .............................. JP2018-091205

(51) Int. Cl.
*B64C 23/00* (2006.01)
(52) U.S. Cl.
CPC .................................. *B64C 23/005* (2013.01)
(58) Field of Classification Search
CPC ............. B64C 23/005; B64C 2230/06; B64C 2230/12; B64C 21/04; F42B 10/663
See application file for complete search history.

(56) References Cited

U.S. PATENT DOCUMENTS

| | | | | |
|---|---|---|---|---|
| 2,763,189 A | * | 9/1956 | Grill | F41F 3/06 89/1.817 |
| 4,463,921 A | * | 8/1984 | Metz | F42B 10/663 244/3.22 |
| 4,482,107 A | * | 11/1984 | Metz | F42B 10/663 244/3.22 |
| 7,183,515 B2 | * | 2/2007 | Miller | B64C 27/18 219/121.5 |
| 7,686,256 B2 | * | 3/2010 | Miller | B64C 23/00 244/198 |
| 9,108,711 B2 | * | 8/2015 | Krueger | F02K 1/28 |
| 9,637,224 B2 | * | 5/2017 | Nikic | B64C 19/00 |
| 2016/0046361 A1 | | 2/2016 | Dan-Jumbo | |

FOREIGN PATENT DOCUMENTS

JP 2017-501072 A 1/2017

* cited by examiner

*Primary Examiner* — Richard R. Green
*Assistant Examiner* — Madison Elizabeth Dittner
(74) *Attorney, Agent, or Firm* — McDermott Will & Emery LLP

(57) ABSTRACT

An aircraft includes an airframe, a hollow member, and a plasma actuator. The hollow member has a body and an internal flow passage. The body extends from front of the airframe to rear of the airframe and has a hollow shape. The internal flow passage extends in the body from the front to the rear. The body has an introduction port configured to introduce a fluid into the internal flow passage, and a blow hole provided more toward the rear than the introduction port, and penetrating the body from an inner circumferential surface of the body to an outer circumferential surface of the body. The plasma actuator is provided at the outer circumferential surface of the body, and disposed on one or more sides, in a circumferential direction of the body, of the blow hole.

22 Claims, 6 Drawing Sheets

AIRCRAFT

CROSS-REFERENCE TO RELATED APPLICATIONS

The present application claims priority from Japanese Patent Application No. 2018-091205 filed on May 10, 2018, the entire contents of which are hereby incorporated by reference.

BACKGROUND

The technology relates to an aircraft.

An aircraft includes a rudder and an elevator, as disclosed in Japanese Unexamined Patent Application Publication (Translation of PCT Application) No. 2017-501072, for example. The rudder controls yaw of the aircraft, and the elevator controls pitch of the aircraft. A wing of the aircraft includes an aileron that controls roll of the aircraft.

SUMMARY

An aspect of the technology provides an aircraft that includes: an airframe; a hollow member having a body and an internal flow passage, in which the body extends from front of the airframe to rear of the airframe and has a hollow shape, the internal flow passage extends in the body from the front to the rear, and the body has an introduction port configured to introduce a fluid into the internal flow passage, and a blow hole provided more toward the rear than the introduction port, and penetrating the body from an inner circumferential surface of the body to an outer circumferential surface of the body; and a plasma actuator provided at the outer circumferential surface of the body, and disposed on one or more sides, in a circumferential direction of the body, of the blow hole.

DETAILED DESCRIPTION

Figure 1:
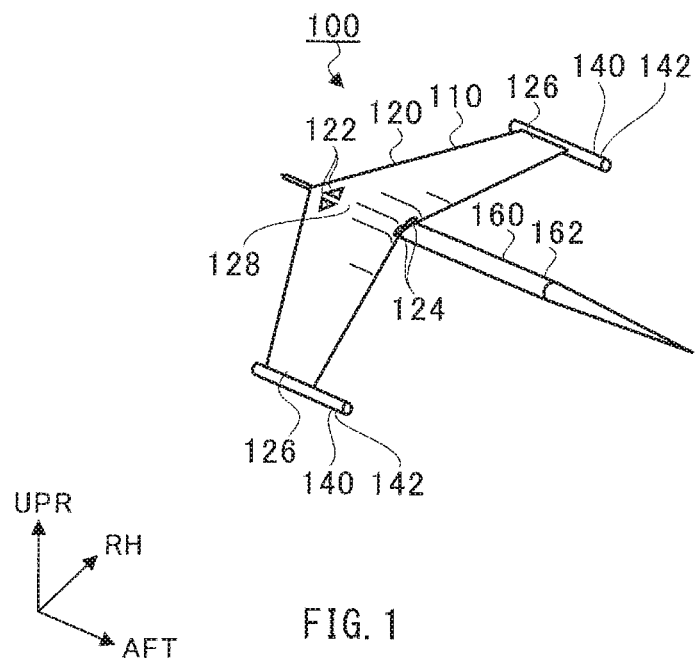
FIG. 1 is a perspective view of an aircraft according to one example implementation of the technology.

In the following, some implementations of the technology are described in detail with reference to the accompanying drawings. Note that sizes, materials, specific values, and any other factors illustrated in respective implementations are illustrative for easier understanding of the technology, and are not intended to limit the scope of the technology unless otherwise specifically stated. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. Further, elements that are not directly related to the technology are unillustrated in the drawings.

An aircraft is steered by causing a rudder and a wing, such as an elevator or an aileron, to displace by means of an actuator. The steering may possibly become difficult if by any chance the rudder and the wing are immobilized. What is therefore desired is a development of a technique that achieves stand-alone steering or auxiliary steering without requiring a movement of the rudder, the wing, or both.

It is desirable to provide an aircraft that makes it possible to achieve stand-alone steering or auxiliary steering without requiring a displacement of a rudder, a wing, or both.

FIG. 1 is a perspective view of an aircraft 100 according to an example implementation of the technology. For example, the aircraft 100 may be an unmanned aircraft, and may be a flying wing aircraft. In an alternative example implementation, the aircraft 100 may be a manned aircraft, or may have a fuselage, a tail unit, or both. It is to be noted that the rear, the right side, and the upper side of an airframe 110 of the aircraft 100 are respectively denoted by arrows AFT, RH, and UPR in FIG. 1. In the following description, the front, the rear, the right side, the left side, the upper side, and the lower side of the airframe 110 may sometimes be referred to simply as "front", "rear", "right side", "left side", "upper side", and "lower side", respectively. For example, the "front" as used herein refers to a traveling direction of the aircraft 100 that travels forward, and refers to the side toward the aircraft nose. The "rear" refers to the side toward the aircraft tail.

Referring to FIG. 1, the aircraft 100 includes the airframe 110. The airframe 110 may include a wing 120. The wing 120 may extend in a width direction of the airframe 110 (hereinafter may sometimes be referred to simply as a "width direction"). The wing 120 may also have an intake port 122 and an exhaust port 124. For example, two intake ports 122 and two exhaust ports 124 may be provided closer to the center, in the width direction, of the wing 120. Note that the number of intake ports 122 and the number of exhaust ports 124 are not limited thereto. The exhaust port 124 may be positioned more toward the rear of the airframe 110 than the intake port 122. The intake port 122 and the exhaust port 124 may be in communication with a later-described engine 200.

The wing 120 may include tips 126 positioned on both sides in the width direction. The tips 126 each may include a wingtip device 140. In one implementation, the wingtip device 140 may serve as a "hollow member". The wingtip device 140 may have a first body 142. For example, the first body 142 may have a substantially cylindrical shape or a substantially tubular shape, although the first body 142 can have any hollow cross-sectional shape. In one implementation, the first body 142 may serve as a "body". In one implementation, the cylindrical shape or the tubular shape may serve as a "hollow shape". The first body 142 extends in a front-rear direction of the airframe 110 (hereinafter may sometimes be referred to simply as a "front-rear direction"). The first body 142 may extend more toward the rear than a connection region in which the first body 142 and the wing 120 are coupled to each other.

The wing 120 may include a central part 128 positioned at the center in the width direction. The central part 128 may include a tail 160. In one implementation, the tail 160 may serve as the "hollow member". The tail 160 may protrude or extend from the central part 128 of the wing 120 toward the rear of the airframe 110. For example, the tail 160 may extend more toward the rear than the center of gravity of the airframe 110. The tail 160 may have a second body 162. For example, the second body 162 may have a substantially cylindrical shape or a substantially tubular shape, although the second body 162 can have any hollow cross-sectional shape. In one implementation, the second body 162 may serve as the "body". The second body 162 may extend in the front-rear direction.

In the present example implementation, the first body 142 and the second body 162 each extend in the front-rear direction. Each of the first body 142 and the second body 162 extend at least from the front toward the rear. Hence, in an alternative example implementation, the first body 142, the second body 162, or both may be inclined relative to the front-rear direction insofar as such inclination does not interrupt a steering operation to be described later.

Figure 2:
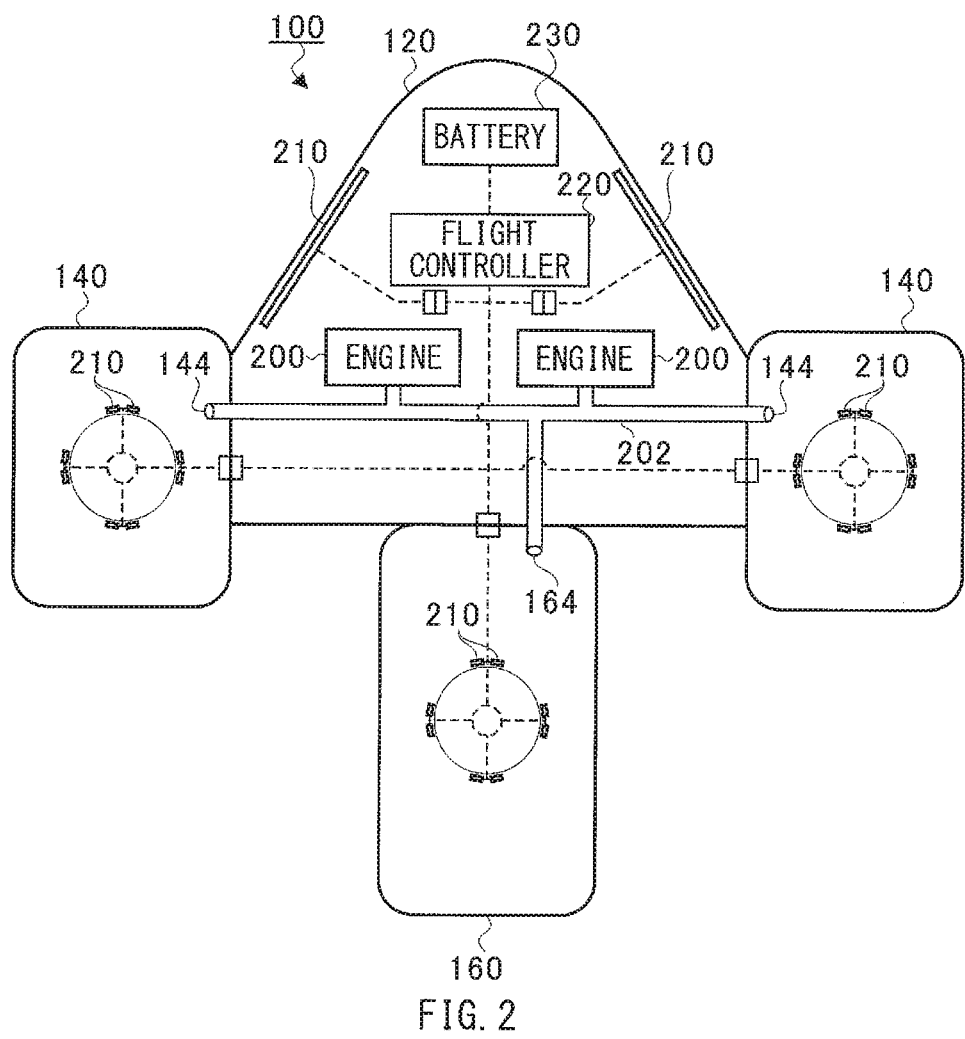
FIG. 2 is a block diagram illustrating an example of an operation related to steering of the aircraft.

FIG. 2 is a block diagram illustrating an example of an operation related to steering of the aircraft 100. In FIG. 2, broken lines denote respective flows of a control signal and electric power. Referring to FIG. 2, the aircraft 100 may include the engine 200, a plasma actuator 210, a flight controller 220, a battery 230, the wing 120, the wingtip device 140, and the tail 160.

The wing 120 may be mounted with two engines 200, although the number of engines 200 is not limited to two. The outside air taken from the intake port 122 may contribute to combustion of each of the engines 200, following which the outside air may be exhausted from the exhaust port 124. In one implementation, the outside air may serve as a "fluid". The aircraft 100 may also have a bleeding flow passage 202. The two engines 200 each may be in communication with the bleeding flow passage 202.

A portion of the outside air compressed by a compressor, provided in the engine 200, may flow to the bleeding flow passage 202 as bleed air. The bleeding flow passage 202 may be in communication with a first bleeding port 144. The first bleeding port 144 may be provided at the first body 142 (see FIG. 1) of the wingtip device 140. In one implementation, the first bleeding port 144 may serve as an "introduction port". The bleeding flow passage 202 may also be in communication with a second bleeding port 164. The second bleeding port 164 may be provided at the second body 162 of the tail 160. In one implementation, the second bleeding port 164 may serve as the "introduction port". The bleed air may be thus guided to the wingtip device 140 and the tail 160 through the bleeding flow passage 202.

The plasma actuator 210 may be provided at one or more of the wingtip device 140, the tail 160, and the wing 120. In the present example implementation, the plasma actuator 210 may be provided at the wingtip device 140, the tail 160, and the wing 120. For example, the plasma actuator 210 may be an actuator that utilizes a dielectric barrier discharge (DBD).

The plasma actuator 210 may include two electrodes disposed diagonally with respect to each other, and a dielectric provided between the two electrodes. In the present example implementation, the plasma actuator 210 may include two electrodes, although the number of electrodes is not limited to two. The plasma actuator 210 may apply a high-frequency, high voltage alternating current to a region between the two electrodes, allowing a plasma to be generated at one of the electrodes that is exposed to the fluid. Upon the generation of the plasma, positive charges of the plasma accelerate toward the other electrode and collide with neutrons, causing a flow of the fluid that travels along the dielectric toward the other electrode.

The plasma actuator 210 is thus able to generate a flow of the fluid by means of the plasma, without utilizing a movable component such as an electric actuator or a hydraulic actuator.

One or both of the flight controller 220 and the battery 230 may be provided at the wing 120. In the present example implementation, both the flight controller 220 and the battery 230 may be provided at the wing 120. The flight controller 220 may operate by the electric power supplied from the battery 230. The flight controller 220 may control start and stop of the application of the voltage to be applied to each of the plasma actuators 210. The battery 230 may supply the voltage, or the electric power, to be applied to the plasma actuators 210. The flight controller 220 may be configured to control independently the plasma actuators 210 provided at the wing 120, the wingtip device 140, and the tail 160.

Figure 3A:
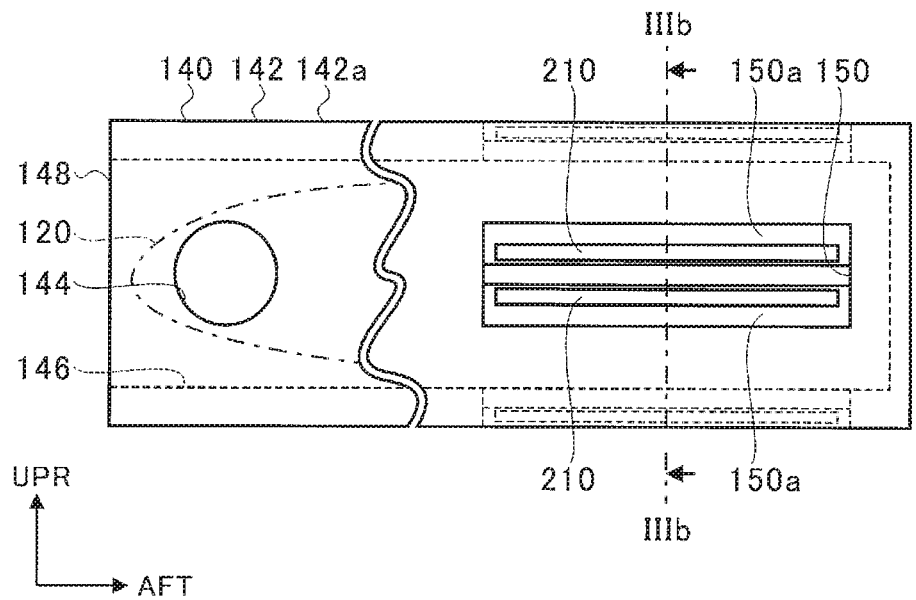
FIG. 3A is a diagram illustrating an example of a wingtip device.
Figure 3B:
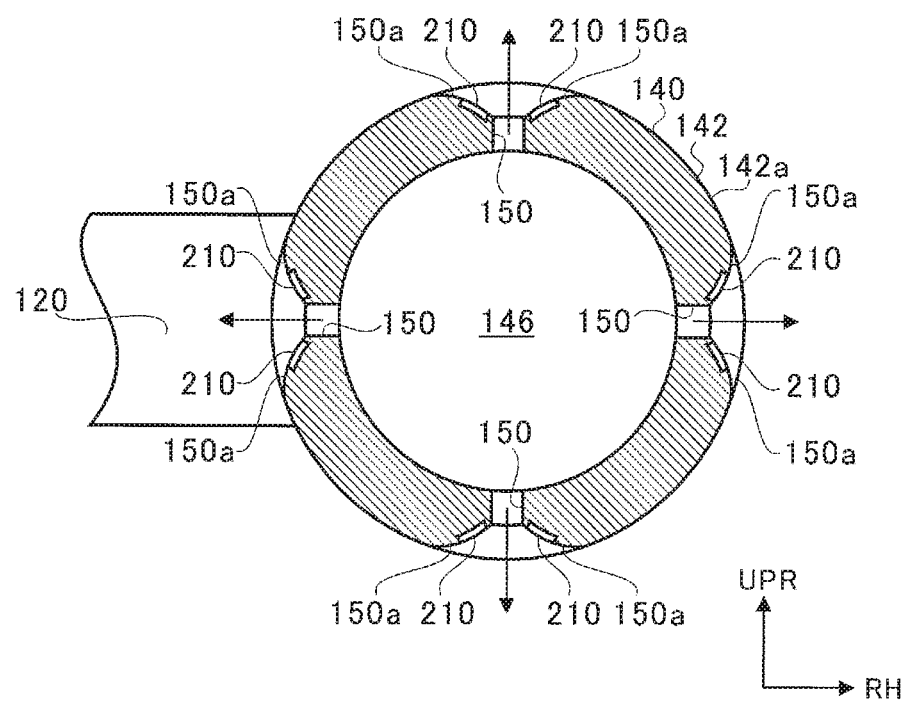
FIG. 3B is another diagram illustrating an example of the wingtip device.

FIGS. 3A and 3B each illustrate the wingtip device 140. FIG. 3A illustrates the wingtip device 140 as viewed from the wing 120, in addition to the connection region (denoted by a chain line) of the wing 120 in which the first body 142 and the wing 120 are coupled to each other. FIG. 3B illustrates a cross section of the wingtip device 140 taken along the line IIIb-IIIb illustrated in FIG. 3A.

Referring to FIGS. 3A and 3B, the first body 142 has an internal flow passage 146 provided inside the first body 142. The internal flow passage 146 extends in the front-rear direction. The internal flow passage 146 extends at least from the front toward the rear as with the first body 142. Hence, in an alternative example implementation, the internal flow passage 146 may be inclined relative to the front-rear direction insofar as such inclination does not interrupt the steering operation to be described later.

The first body 142 has a front-end port 148. The front-end port 148 may be provided at an end of the first body 142 that is positioned at the front of the first body 142. The front-end port 148 may be an opening of the internal flow passage 146. In one implementation, the front-end port 148 may serve as the "introduction port". The front-end port 148 allows the outside air to be introduced into the internal flow passage 146 upon flying of the aircraft 100. The first body 142 may have a closed end provided at the rear of the first body 142.

The first bleeding port 144 provided at the first body 142 of the wingtip device 140 may be in communication with the internal flow passage 146. The first bleeding port 144 may guide the bleed air into the internal flow passage 146.

The first body 142 also has a blow hole 150. The blow hole 150 may be provided at a region of the first body 142 that is positioned more toward the rear than the connection region in which the first body 142 and the wing 120 are coupled to each other. The blow hole 150 is positioned more toward the rear of the first body 142 than the front-end port 148. The blow hole 150 penetrates from an inner circumferential surface (i.e., a wall surface that forms the internal flow passage 146) of the first body 142 to an outer circumferential surface 142a of the first body 142.

Referring to FIG. 3A, the blow hole 150 may so extend as to be longer in the front-rear direction than a width, in a circumferential direction of the first body 142, of the blow hole 150. The blow hole 150 may be positioned more toward the rear than the center of gravity of the airframe 110. Referring to FIG. 3B, in the present example implementation, the first body 142 may have four blow holes 150 that are so provided as to be separated away from each other at regular intervals in the circumferential direction of the first body 142. Note, however, that at least one blow hole 150 suffices. In an alternative example implementation, the first body 142 may have two blow holes 150, three blow holes 150, or five or more blow holes 150.

The blow hole 150 may have an inner circumferential surface including a curved surface 150a. The curved surface 150a may be positioned on a side on which the outer circumferential surface 142a of the first body 142 is provided. For example, the curved surface 150a may be continuous from the outer circumferential surface 142a. The curved surface 150a may be continuous substantially to the center, in a radial direction of the first body 142, of the blow hole 150. The curved surface 150a may extend away from the center, in the circumferential direction of the first body 142, of the blow hole 150 as the curved surface 150a extends outwardly in the radial direction of the first body 142. Accordingly, the blow hole 150 may expand toward the outer circumferential surface 142a owing to the curved surface 150a. The curved surface 150a may be provided on both sides, in the circumferential direction of the first body 142, of the blow hole 150.

The plasma actuator 210 is provided at the first body 142. A part of the plasma actuator 210 may be embedded in the first body 142, and any other part of the plasma actuator 210 may be exposed on the curved surface 150a. In the present example implementation, the plasma actuators 210 may be disposed on respective both sides, in the circumferential direction of the first body 142, of the blow hole 150. Optionally, a part of the plasma actuator 210 may be protruded from the blow hole 150. In the present example implementation, eight plasma actuators 210 may be provided for four blow holes 150, although a relationship between the number of plasma actuators 210 and the number of blow holes 150 is not limited thereto.

The plasma actuators 210 may be plane symmetric with respect to a center plane of the blow hole 150. The center plane of the blow hole 150 may be positioned at the center of a width, in the circumferential direction of the first body 142, of the blow hole 150. The center plane of the blow hole 150 may extend both in the radial direction of the first body 142 and in the front-rear direction. In an alternative example implementation, the plasma actuators 210 may be asymmetric with respect to the center plane of the blow hole 150.

The fluid, such as the outside air or the bleed air, that has flown into the internal flow passage 146 may blow out from the blow hole 150 to the outside of the first body 142 as illustrated by arrows in FIG. 3B. The plasma actuator 210 may act on the fluid that blows out from the blow hole 150.

Figure 4A:
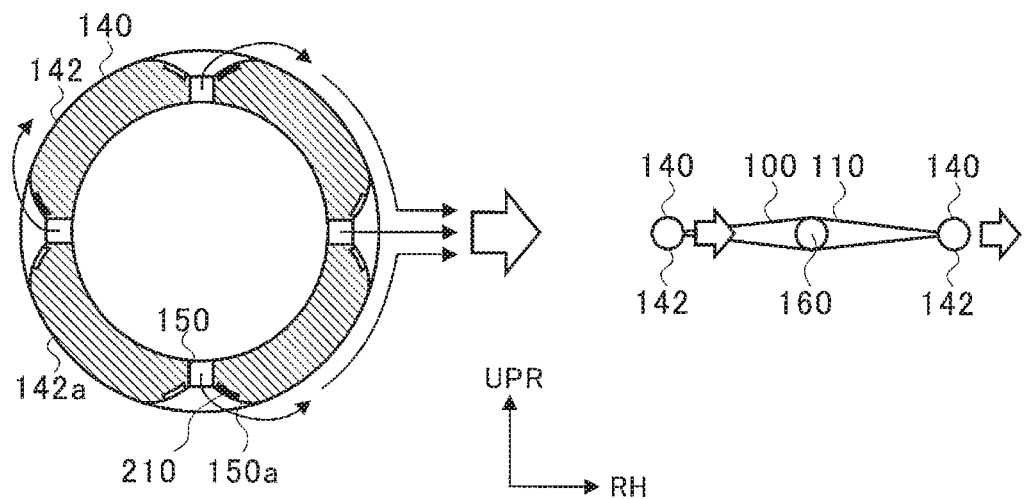
FIG. 4A is a diagram illustrating an example of steering that uses the wingtip devices.
Figure 4B:
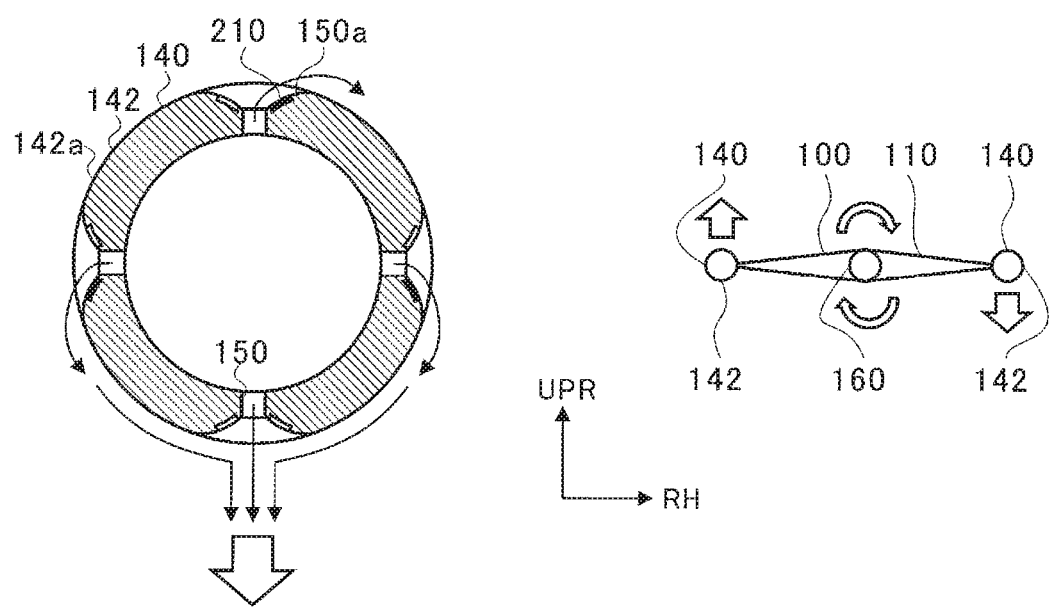
FIG. 4B is another diagram illustrating an example of the steering that uses the wingtip devices.

FIGS. 4A and 4B each illustrate an example of steering that uses the wingtip devices 140. In the following drawings, any plasma actuator 210 in operation is illustrated in black, and any plasma actuator 210 not in operation is illustrated in white.

FIG. 4A illustrates an example in which force in a right yaw direction acts on the aircraft 100 through the use of the wingtip devices 140. Upon the operation of the plasma actuator 210, a flow of the fluid may be generated that travels along the curved surface 150a toward the outer circumferential surface 142a of the first body 142. Hence, the fluid that blows out from the blow hole 150 may be drawn toward the curved surface 150a owing to the Coanda effect, thus flowing along the outer circumferential surface 142a.

Referring to FIG. 4A, operating the three plasma actuators 210 as illustrated in the drawing on the left side in FIG. 4A may cause a flow of the fluid to be generated that travels toward the right side of the wingtip device 140. Hence, a flow velocity may increase and a pressure may decrease accordingly on the right side of the wingtip device 140, causing the force in the right yaw direction to act on the wingtip device 140. The two wingtip devices 140 may cause their plasma actuators 210 to operate likewise. Accordingly, the force in the right yaw direction may act on the airframe 110 through the use of the two wingtip devices 140, as illustrated in the drawing on the right side in FIG. 4A.

FIG. 4B illustrates an example in which force in a right roll direction acts on the aircraft 100 through the use of the wingtip devices 140. Operating the three plasma actuators 210 as illustrated in the drawing on the left side in FIG. 4B may cause a flow of the fluid to be generated that travels toward the lower side of the wingtip device 140. Hence, a flow velocity may increase and a pressure may decrease accordingly on the lower side of the wingtip device 140, causing force oriented toward the lower side to act on the wingtip device 140. Further, force oriented toward the upper side may be generated through the use of the wingtip device 140 positioned on the left side of the airframe 110 while generating the force oriented toward the lower side through the use of the wingtip device 140 positioned on the right side of the airframe 110, as illustrated in the drawing on the right side in FIG. 4B. Accordingly, the force in the right roll direction may act on the airframe 110 through the use of the two wingtip devices 140.

As described previously, the blow hole 150 may be positioned more toward the rear than the center of gravity of the airframe 110. This configuration also allows force in a pitch direction to act on the aircraft 100 through the use of the wingtip devices 140. For example, referring to the drawing on the right side in FIG. 4B, generating force oriented toward the lower side through the use of the wingtip devices 140, positioned on respective both sides of the airframe 110, may allow force oriented on a plus side in a pitch direction to act on the aircraft 100. Generating force oriented toward the upper side through the use of the wingtip devices 140, positioned on the respective both sides of the airframe 110, may allow force oriented on a minus side in the pitch direction to act on the aircraft 100.

Figure 5A:
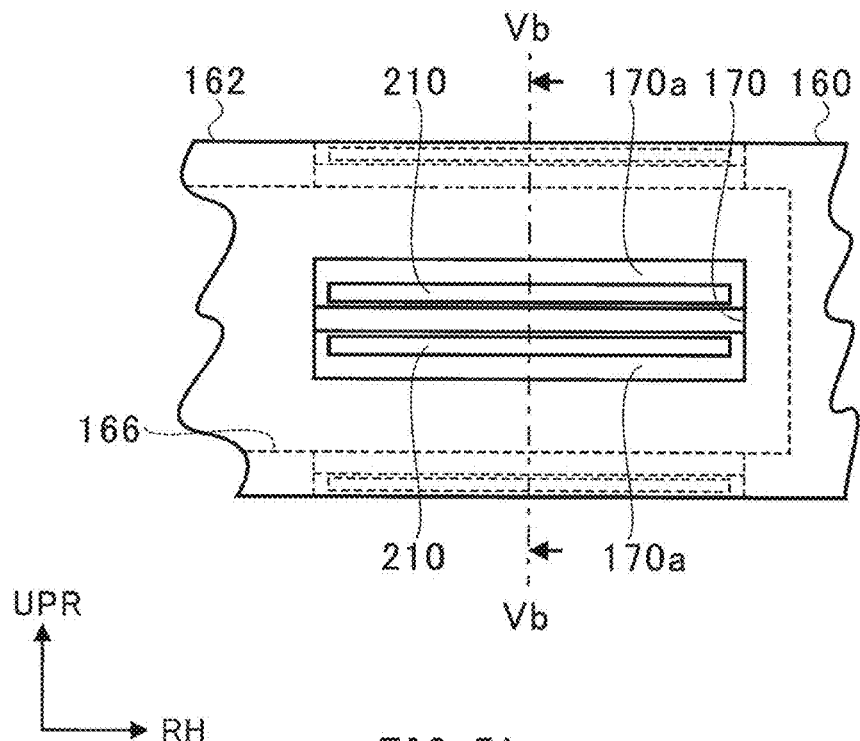
FIG. 5A is a diagram illustrating an example of a tail.
Figure 5B:
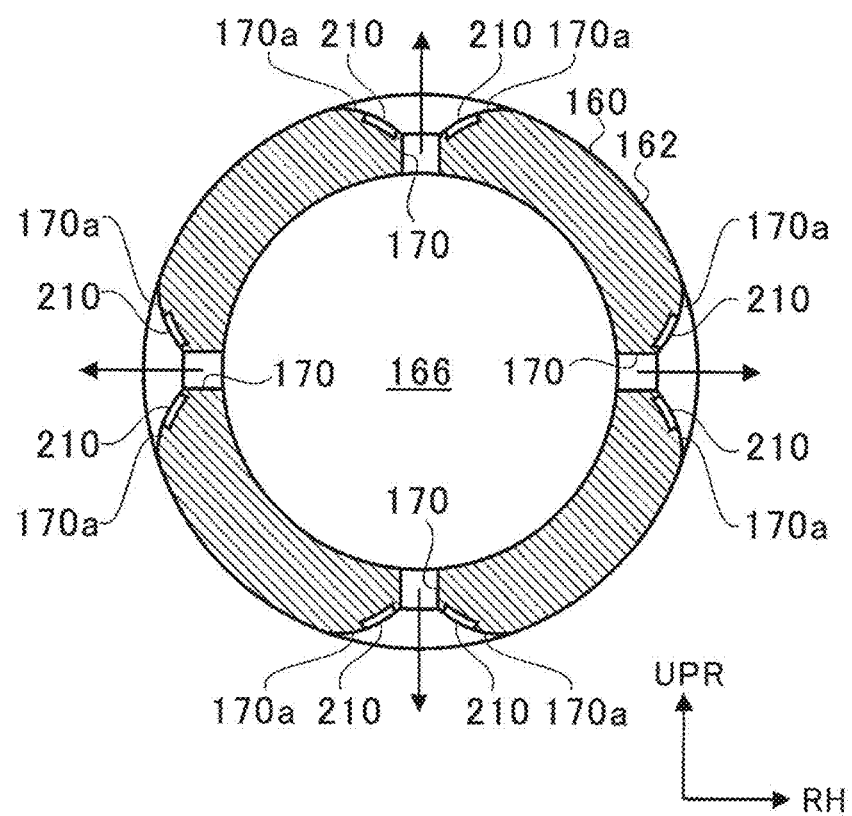
FIG. 5B is another diagram illustrating an example of the tail.

FIGS. 5A and 5B each illustrate the tail 160. FIG. 5A illustrates a part of the tail 160 as viewed from the upper side. FIG. 5B illustrates a cross section of the tail 160 taken along the line Vb-Vb illustrated in FIG. 5A.

Referring to FIGS. 5A and 5B, the second body 162 has an internal flow passage 166 provided inside the second body 162. The internal flow passage 166 extends in the front-rear direction. The internal flow passage 166 extends at least from the front toward the rear as with the second body 162. Hence, in an alternative example implementation, the internal flow passage 166 may be inclined relative to the front-rear direction insofar as such inclination does not interrupt the steering operation to be described later.

The second body 162 has the second bleeding port 164 (unillustrated in FIGS. 5A and 5B). The second bleeding port 164 may be provided at an end of the second body 162 that is positioned at the front of the second body 162. For example, the second bleeding port 164 may be provided at a connection region in which the second body 162 and the wing 120 are coupled to each other. The second bleeding port 164 may be in communication with the internal flow passage 166. The second bleeding port 164 may guide the bleed air into the internal flow passage 166. The second body 162 may have a closed end provided at the rear of the second body 162 (unillustrated in FIGS. 5A and 5B).

The second body 162 has a blow hole 170, and may have a curved surface 170a. The plasma actuator 210 is provided at the second body 162. The blow hole 170, the curved surface 170a, and the plasma actuator 210 may be substantially the same as or similar to the blow hole 150, the curved surface 150a, and the plasma actuator 210, respectively, and therefore will not be described in detail again.

Figure 6A:
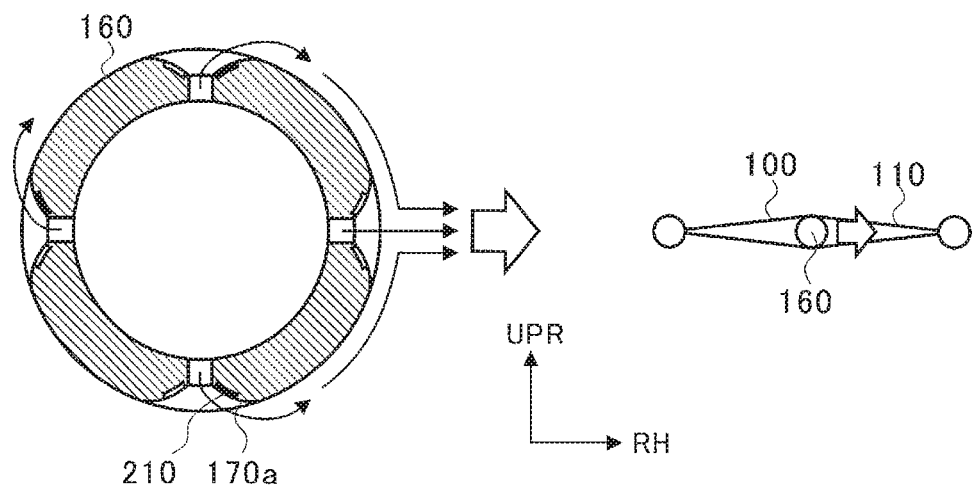
FIG. 6A is a diagram illustrating an example of steering that uses the tail.
Figure 6B:
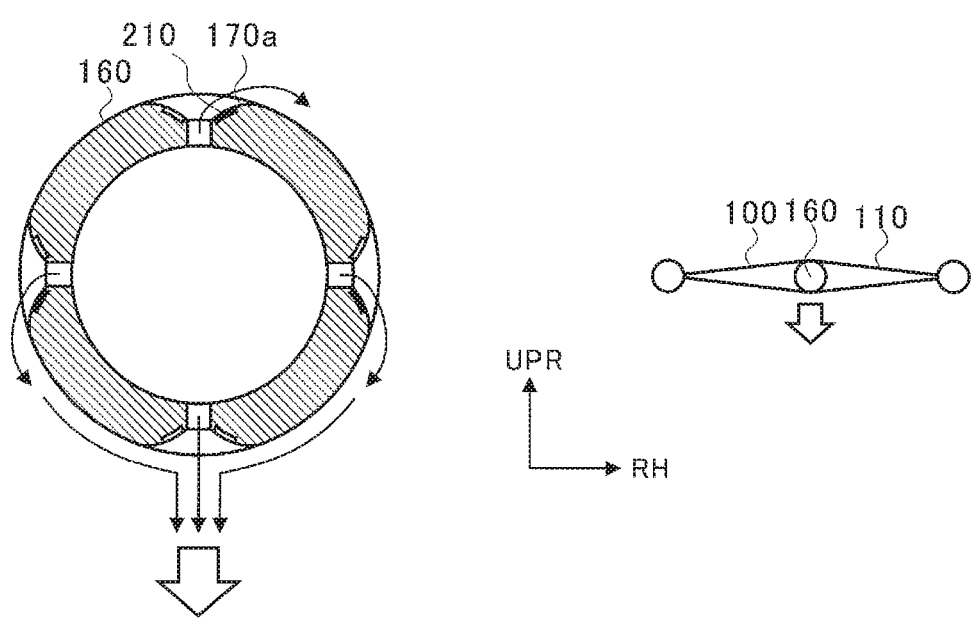
FIG. 6B is another diagram illustrating an example of the steering that uses the tail.
Figure 6C:
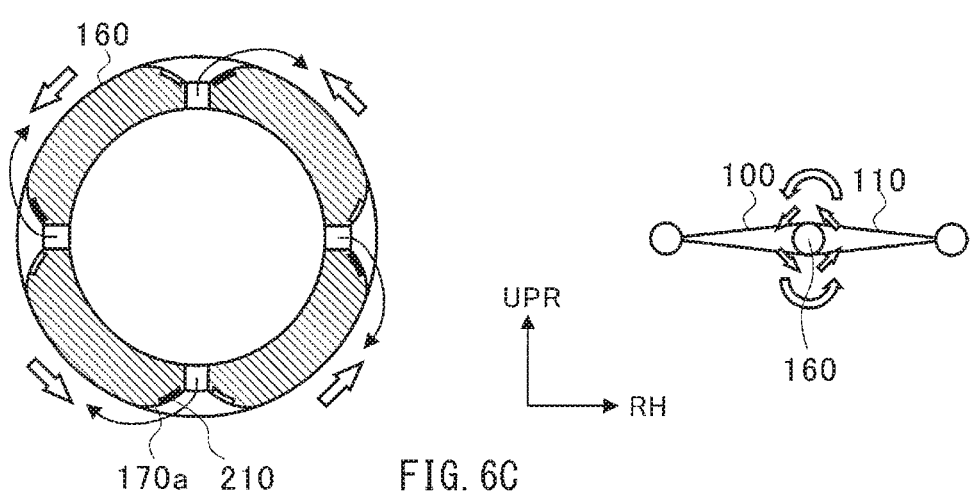
FIG. 6C is another diagram illustrating an example of steering that uses the tail.

FIGS. 6A to 6C each illustrate an example of steering that uses the tail 160. FIG. 6A illustrates an example in which force in a right yaw direction acts on the aircraft 100 through the use of the tail 160. Operating the three plasma actuators 210 as illustrated in the drawing on the left side in FIG. 6A may cause a flow of the fluid to be generated that travels toward the right side of the tail 160. Hence, a flow velocity may increase and a pressure may decrease accordingly on the right side of the tail 160, causing the force in the right yaw direction to act on the tail 160. Accordingly, the force in the right yaw direction may act on the airframe 110 as illustrated in the drawing on the right side in FIG. 6A. Note that the tail 160 allows the force, oriented in a yaw direction, to be generated that is greater than the force, oriented in the yaw direction, to be generated by the wingtip device 140.

FIG. 6B illustrates an example in which force in a minus pitch direction acts on the aircraft 100 through the use of the tail 160. Operating the three plasma actuators 210 as illustrated in the drawing on the left side in FIG. 6B may cause a flow of the fluid to be generated that travels toward the lower side of the tail 160. Hence, a flow velocity may increase and a pressure may decrease accordingly on the lower side of the tail 160, causing the force in the minus pitch direction to act on the tail 160. Accordingly, the force in the minus pitch direction may act on the airframe 110 as illustrated in the drawing on the right side in FIG. 6B.

FIG. 6C illustrates an example in which force in a left roll direction acts on the aircraft 100 through the use of the tail 160. Operating the four plasma actuators 210 as illustrated in the drawing on the left side in FIG. 6C may cause a flow of the fluid to be generated that travels counterclockwise (travels in a right roll direction) with respect to the tail 160. Hence, the force in the left roll direction may act on the tail 160 owing to counteracting force derived from the blowing fluids. Accordingly, the force in the left roll direction may act on the airframe 110 as illustrated in the drawing on the right side in FIG. 6C.

Figure 7A:
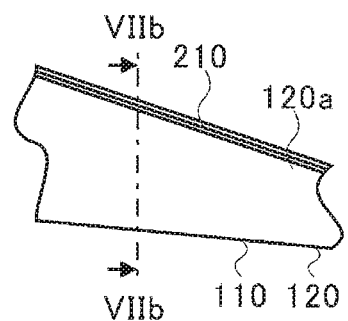
FIG. 7A is a diagram illustrating an example of steering that uses a wing.
Figure 7B:
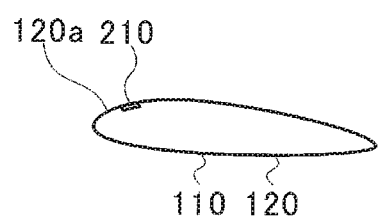
FIG. 7B is another diagram illustrating an example of the steering that uses the wing.

FIGS. 7A and 7B each illustrate an example of steering that uses the wing 120. FIG. 7A illustrates a part of the wing 120 on the right side. FIG. 7B illustrates a cross section of the wing 120 taken along the line VIIb-VIIb illustrated in FIG. 7A. Referring to FIGS. 7A and 7B, the plasma actuator 210 may be provided in a region of the wing 120 that is positioned on the upper side of a front end 120a of the wing 120. For example, the plasma actuator 210 may be embedded in the region positioned on the upper side of the front end 120a, and a part of the plasma actuator 210 may be exposed on a surface of the front end 120a.

Upon the operation of the plasma actuator 210, a flow of the fluid may be generated that travels along the front end 120a toward the rear. Hence, a portion of the fluid that is supposed to travel away from the wing 120 may be drawn toward the front end 120a owing to the Coanda effect, thus flowing along the front end 120a. Hence, a flow velocity may increase and a pressure may decrease accordingly on the upper side of the wing 120, causing the force oriented toward the upper side to act on the wing 120.

The plasma actuators 210 may be provided at the respective right and left front ends 120a of the wing 120. Operating both of the plasma actuators 210 may allow force oriented on a plus side in the pitch direction to act on the airframe 110. Operating only the plasma actuator 210 provided on the left side may allow force in a right roll direction to act on the airframe 110, whereas operating only the plasma actuator 210 provided on the right side may allow force in a left roll direction to act on the airframe 110.

According to the foregoing example implementation, the aircraft 100 allows for the steering through the use of the plasma actuator 210, without requiring a displacement by means of an actuator of a rudder and a wing, such as an elevator or an aileron.

Hence, according to any implementation of the technology, it is possible to provide an aircraft that makes it possible to achieve stand-alone steering or auxiliary steering without requiring a displacement of the rudder, the wing, or both.

Although some example implementations of the technology have been described in the foregoing with reference to the accompanying drawings, the technology is by no means limited to the example implementations described above.

For example, the aircraft 100 according to the foregoing example implementation may not include the displaceable rudder and the displaceable wing, such as the elevator or the aileron. However, in an alternative example implementation, the aircraft 100 may include one or both of the displaceable rudder and the displaceable wing. In such an alternative example implementation, one of the steering based on the plasma actuator 210 and steering based on the displaceable rudder and/or the displaceable wing serves as auxiliary steering, which helps to improve overall steering performance.

The wing 120 in the foregoing example implementation may be provided with the plasma actuator 210. Providing the plasma actuator 210 at the wing 120, however, is not necessarily an essential feature. In an alternative example implementation, the wing 120 may not include the plasma actuator 210.

The foregoing example implementation may include both of the wingtip device 140 and the tail 160. However, providing one or both of the wingtip device 140 and the tail 160 suffices in an alternative example implementation. Further, the wingtip device 140 and the tail 160 are each simply a non-limiting example of the hollow member. Hence, in an alternative example implementation, the hollow member may be provided at any other part of the aircraft 100 insofar as steering based on the plasma actuator 210 is possible.

The plasma actuators 210 in the foregoing example implementation may be disposed on the respective both sides, in the circumferential direction of the first body 142 or the second body 162, with respect to the center of the blow hole 150 of the first body 142 or with respect to the center of the blow hole 170 the second body 162. Providing the plasma actuators 210 on the both sides of the blow holes 150 or 170 helps to improve operability in terms of a direction of flow of the fluid, as compared with a case in which the plasma actuator 210 is provided on only one side, in the circumferential direction, with respect to the center of the blow hole 150 or 170. However, in an alternative example implementation, the plasma actuator 210 may be disposed on one side or both sides, in the circumferential direction, with respect to the center of the blow hole 150 or 170.

The foregoing example implementation may include four or more blow holes 150 or 170 that are so provided as to be separated away from each other at regular intervals in the circumferential direction of the first body 142 or the second body 162. Providing the four or more blow holes 150 and the four or more blow holes 170 helps to allow the force to act on the hollow member easily from any direction, such as from the upper side, the lower side, the right side, or the left side. However, providing at least one blow hole 150 and at least one blow hole 170 suffices in an alternative example implementation.

The foregoing example implementation may include the curved surfaces 150a and 170a. Providing the curved surfaces 150a and 170a helps to allow the fluid blown out from each of the blow holes 150 and 170 to flow along the corresponding curved surface 150a or 170a easily. Providing the curved surfaces 150a and 170a, however, is not necessarily an essential feature. An alternative example implementation may not include the curved surfaces 150a and 170a.

The positions at which the first bleeding port 144 and the second bleeding port 164 are provided are not limited to those described in the foregoing example implementation. The first bleeding port 144 and the second bleeding port 164 according to an alternative example implementation may respectively be positioned more toward the front than the blow holes 150 and 170. Further, an alternative example implementation may include the multiple first bleeding port 144, the multiple second bleeding port 164, or both.

The blow hole 150 in the foregoing example implementation may be positioned more toward the rear than the center of gravity of the airframe 110. This configuration helps to allow the force in the yaw direction to act on the airframe 110 through the use of the wingtip device 140. However, in an alternative example implementation, the position in the front-rear direction of the blow hole 150 may be partially or entirely overlapped with the center of gravity of the airframe 110.

The first body 142 and the second body 162 in the foregoing example implementation each may have a circular shape or an exact circular shape as viewed from the rear. In an alternative example implementation, one or both of the first body 142 and the second body 162 may have any shape other than the circular shape or the exact circular shape, such as an elliptical shape, as viewed from the rear.

The foregoing example implementation may guide the bleed air to the first body 142 and the second body 162. Guiding the bleed air to the first and the second bodies 142 and 162 is more stabilized in supply than a case where exhaust air of the engine 200 is guided to the first and the second bodies 142 and 162. However, in an alternative example implementation, the exhaust air may be guided to one or both of the first body 142 and the second body 162.

The first body 142 in the foregoing example implementation may be provided with the front-end port 148 that allows for introduction of the outside air. Providing the front-end port 148 at the first body 142, however, is not necessarily an essential feature. In an alternative example implementation, the first body 142 may not have the front-end port 148.

It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. An aircraft comprising:
an airframe;
a wing extending in a width direction of the airframe;
a hollow member having:
a body being coupled to the wing, the body extending from front of the airframe to rear of the airframe, the body having a hollow shape; and
an internal flow passage extending in the body from the front to the rear,
wherein the body having includes:
an introduction port disposed at a connection region at which the body and the wing are coupled to each other, the introduction port being configured to introduce a fluid into the internal flow passage; and
a blow hole provided more toward the rear than the introduction port, and penetrating the body from an inner circumferential surface of the body to an outer circumferential surface of the body; and
a plasma actuator provided at the outer circumferential surface of the body, and disposed on one or more sides, in a circumferential direction of the body, of the blow hole.

2. The aircraft according to claim 1, wherein the hollow member is provided at an end, in the width direction of the airframe, of the wing of the aircraft.

3. The aircraft according to claim 2, wherein the plasma actuator is disposed on both sides, in the circumferential direction of the body, of the blow hole.

4. The aircraft according to claim 3, wherein
the blow hole comprises four or more blow holes that are separated away from each other at regular intervals in the circumferential direction of the body, and
the plasma actuator is provided for each of the blow holes.

5. The aircraft according to claim 3, wherein
the blow hole has an inner circumferential surface including a curved surface, the curved surface extending away from a center of the blow hole as the curved surface extends outwardly in a radial direction of the body, and
the plasma actuator is provided at the curved surface.

6. The aircraft according to claim 2, wherein
the blow hole comprises four or more blow holes that are separated away from each other at regular intervals in the circumferential direction of the body, and
the plasma actuator is provided for each of the blow holes.

7. The aircraft according to claim 2, wherein
the blow hole has an inner circumferential surface including a curved surface, the curved surface extending away from a center of the blow hole as the curved surface extends outwardly in a radial direction of the body, and
the plasma actuator is provided at the curved surface.

8. The aircraft according to claim 1, wherein the hollow member comprises a tail extending more toward the rear than a center of gravity of the airframe.

9. The aircraft according to claim 8, wherein the plasma actuator is disposed on both sides, in the circumferential direction of the body, of the blow hole.

10. The aircraft according to claim 9, wherein
the blow hole comprises four or more blow holes that are separated away from each other at regular intervals in the circumferential direction of the body, and
the plasma actuator is provided for each of the blow holes.

11. The aircraft according to claim 9, wherein
the blow hole has an inner circumferential surface including a curved surface, the curved surface extending away from a center of the blow hole as the curved surface extends outwardly in a radial direction of the body, and the plasma actuator is provided at the curved surface.

12. The aircraft according to claim 8, wherein
the blow hole comprises four or more blow holes that are separated away from each other at regular intervals in the circumferential direction of the body, and
the plasma actuator is provided for each of the blow holes.

13. The aircraft according to claim 8, wherein
the blow hole has an inner circumferential surface including a curved surface, the curved surface extending away from a center of the blow hole as the curved surface extends outwardly in a radial direction of the body, and
the plasma actuator is provided at the curved surface.

14. The aircraft according to claim 1, wherein the plasma actuator is disposed on both sides, in the circumferential direction of the body, of the blow hole.

15. The aircraft according to claim 14, wherein
the blow hole comprises four or more blow holes that are separated away from each other at regular intervals in the circumferential direction of the body, and
the plasma actuator is provided for each of the blow holes.

16. The aircraft according to claim 14, wherein
the blow hole has an inner circumferential surface including a curved surface, the curved surface extending away from a center of the blow hole as the curved surface extends outwardly in a radial direction of the body, and
the plasma actuator is provided at the curved surface.

17. The aircraft according to claim 1, wherein
the blow hole comprises four or more blow holes that are separated away from each other at regular intervals in the circumferential direction of the body, and
the plasma actuator is provided for each of the blow holes.

18. The aircraft according to claim 1, wherein
the blow hole has an inner circumferential surface including a curved surface, the curved surface extending away from a center of the blow hole as the curved surface extends outwardly in a radial direction of the body, and
the plasma actuator is provided at the curved surface.

19. An aircraft comprising:
an airframe;
a hollow member having:
  a body extending from front of the airframe to rear of the airframe and having a hollow shape; and
  an internal flow passage extending in the body from the front to the rear,
  wherein the body includes:
    an introduction port configured to introduce a fluid into the internal flow passage;
    a first blow hole penetrating the body from an inner circumferential surface of the body to an outer circumferential surface of the body, and opening toward a first direction at the outer circumferential surface of the body;
    a second blow hole penetrating the body from the inner circumferential surface of the body to the outer circumferential surface of the body, and opening toward a second direction at the outer circumferential surface of the body, the second direction is substantially opposite to the first direction;
    a first opening portion of the first blow hole provided on a side on which the outer circumferential surface of the body, and expanding toward the first direction; and
    a second opening portion of the second blow hole provided on a side on which the outer circumferential surface of the body, and expanding toward the second direction;
  a first plasma actuator provided at the first opening portion, the first plasma actuator being provided on a third direction side with respect to a center of the first opening portion, the third direction being substantially orthogonal to the first direction;
  a second plasma actuator provided at the first opening portion, the second plasma actuator being provided on a forth direction side with respect to the center of the first opening portion, the forth direction being substantially opposite the third direction;
  a third plasma actuator provided at the second opening portion, the third plasma actuator being provided on the third direction side with respect to a center of the second opening portion;
  a forth plasma actuator provided at the second opening portion, the forth plasma actuator being provided on the forth direction side with respect to the center of the second opening portion; and
  a flight controller configured to direct a flow of the fluid blown out from the first blow hole and the second blow hole by controlling the first plasma actuator, the second plasma actuator, the third plasma actuator, and the forth plasma actuator.

20. The aircraft according to claim 19, wherein
the flight controller activates the first plasma actuator and the third plasma actuator, and deactivates the second plasma actuator and the forth plasma actuator to direct the fluid toward the third direction, and
the flight controller activates the second plasma actuator and the forth plasma actuator, and deactivates the first plasma actuator and the third plasma actuator to direct the fluid toward the forth direction.

21. The aircraft according to claim 20, wherein
the flight controller 1) activates the third plasma actuator, and deactivates the first plasma actuator, the second plasma actuator, and the forth plasma actuator, or 2) activates the forth plasma actuator, and deactivates the first plasma actuator, the second plasma actuator, and the third plasma actuator, to direct the fluid toward the first direction, and
the flight controller 1) activates the first plasma actuator, and deactivates the second plasma actuator, the third plasma actuator, and the forth plasma actuator, or 2) activates the second plasma actuator, and deactivates the first plasma actuator, the third plasma actuator, and the forth plasma actuator, to direct the fluid toward the second direction.

22. The aircraft according to claim 21, wherein the flight controller 1) activates the first plasma actuator and the forth plasma actuator, and deactivates the second plasma actuator and the third plasma actuator, or 2) activates the second plasma actuator and the third plasma actuator, and deactivates the first plasma actuator and the forth plasma actuator, to direct the fluid along a circumferential direction of the body.

* * * * *